United States Patent [19]
Childress

[11] Patent Number: 5,483,925
[45] Date of Patent: Jan. 16, 1996

[54] ANIMAL TETHER

[76] Inventor: Jack E. Childress, 28701 Deer Creek Trail, Pine Valley, Calif. 91962

[21] Appl. No.: 247,280

[22] Filed: May 23, 1994

[51] Int. Cl.$^6$ ................................................. A01K 27/00
[52] U.S. Cl. ................................................................ 119/795
[58] Field of Search .................................. 119/795, 784, 119/771, 792, 793

[56] References Cited

U.S. PATENT DOCUMENTS

| | | | |
|---|---|---|---|
| 2,778,335 | 1/1957 | Hirsch | 119/793 |
| 4,252,084 | 2/1981 | Willow | 119/771 |
| 4,879,972 | 11/1989 | Crowe et al. | 119/792 |
| 4,947,801 | 8/1990 | Glass | 119/784 X |
| 4,958,597 | 9/1990 | Mildner | 119/771 |
| 5,003,929 | 4/1991 | Dean | 119/784 |

Primary Examiner—Thomas Price
Attorney, Agent, or Firm—Brown, Martin, Haller & McClain

[57] ABSTRACT

To prevent an animal such as a dog from falling or jumping out of a pickup truck, first, second and third cables, each having a connected end and a free end have their connected ends joined together at a common connection point and their free ends terminated with a clip or snap fastener. The first and second cables are equal in length and are approximately one-half the width of the bed of the pickup truck. The length of the third cable is no greater than the length of the first or second cable. The free ends of the first and second cables are clipped to suitable points on the perimeter of the truck bed, and the free end of the third cable is clipped to the collar of the animal.

8 Claims, 1 Drawing Sheet

ANIMAL TETHER

BACKGROUND OF THE INVENTION

Transporting an animal such as a dog in the bed of a pickup truck is dangerous because the dog may jump off, lose its balance, or fall off while the truck is in motion. This is clearly harmful to the animal and, in addition, presents a serious hazard to vehicles which may be following the truck in which the animal is riding. In an attempt to prevent this risk of injury to animals and other motorists, many states have enacted laws requiring persons who transport their dogs in open truckbeds to restrain the dog in some manner.

A number of different methods have been used to comply with these laws and/or limit the dog's mobility in the open area in which it is riding. Dogs have been restrained within the open truckbed by connecting one end of a leash or rope to the dog's collar and the other end to a convenient portion of the truck. However, the only such portions of the truck are typically on the edge or perimeter of the bed. Therefore, this method cannot prevent the dog from falling or jumping off the edge of the truck bed near the point where the leash is attached, presenting a significant risk of the dog being helplessly suspended over the side of the truck. Dogs have also been tied by connecting the leash to a rope that is stretched across the width of the truck bed. The knot with which the leash is tied onto the rope is sufficiently loose to allow it to slide across the rope as the dog moves to either side of the truck. This method cannot prevent the dog from falling or jumping off the edges of the truck near the points where the rope is attached. Moreover, the dog and its leash can become entangled in the rope if the leash becomes wound around the rope as a result of the dog's movement. Finally, others have used chains either attached at a single point or spanning the truck bed to which the dog's collar is attached. Unless the chains are smooth, with cleanly finished, i.e., welded links, the dog could itself by chewing on the chain or by rubbing against the chain, causing skin abrasions. Also, the weight of a metal chain can be overwhelming to all but the largest dogs.

It would be desirable to provide a tether that prevents the animal from moving out of a predetermined area, such as the bed of a pickup truck bed, that provides the animal a limited but comfortable range of movement, and that minimizes the likelihood that the animal will become entangled. These problems and deficiencies are clearly felt in the art and are solved by the present invention in the manner described below.

BRIEF SUMMARY OF THE INVENTION

The present invention comprises first, second and third cables, each having a connected end and a free end. The connected ends of the cables are joined together at a connection point. The free end of each cable has a suitable clip or snap fastener. The first and second cables are equal in length and are approximately one-half the width of the bed of a typical pickup truck. The length of the third cable is no greater than the length of the first or second cable. Although the three cables are referred to herein as separate elements for conceptual clarity, it should be understood that any two of these elements may be portions of the same unitary length of cable.

To use the present invention, the free ends of the first and second cables are clipped to suitable points on the perimeter of the truck bed. Typically, these attachment points are the hooks or other tie-downs that are formed in the upper edges of the beds of most pick-up trucks. The points are preferably directly opposite from one another across the width of the truck bed, such that the combined length of the first and second cables spans the width of the bed, and the connection point is in the center of the bed. The free end of the third cable can then be clipped to the animal's collar. The animal cannot move beyond the perimeter of the truck bed because the third cable is not sufficiently long.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF THE PREFERRED EMBODIMENTS

Figure 1:
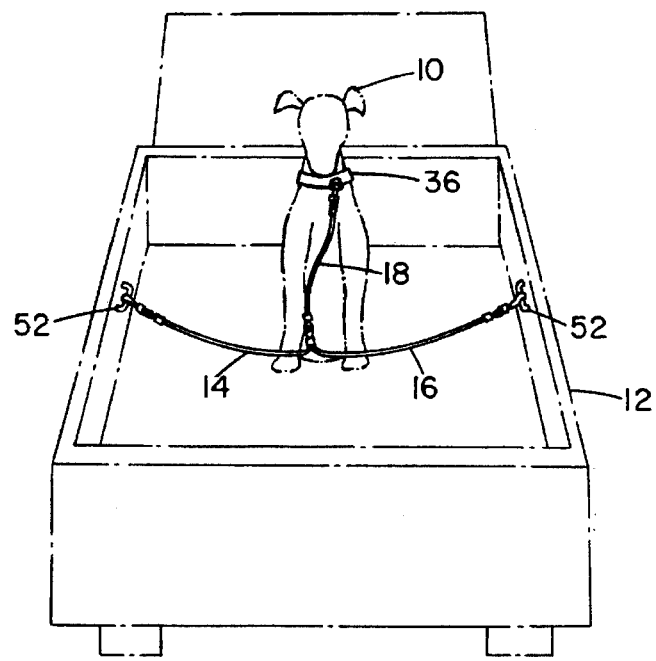
FIG. 1 is a perspective view of the present invention installed in the bed of a pickup truck with a dog tethered.
Figure 2:
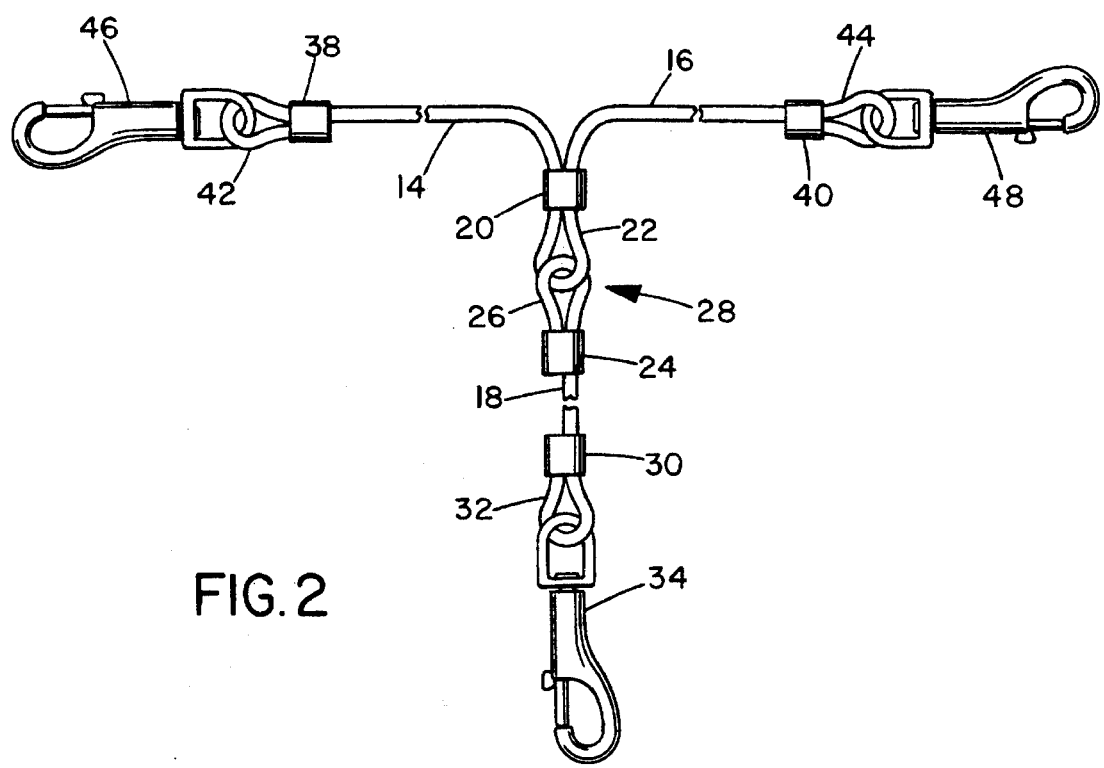
FIG. 2 is a plan view the present invention.

As illustrated in FIG. 1, a dog 10 is tethered to the bed of a pickup truck 12 using the present invention. As illustrated in FIG. 2, the present invention comprises a first cable portion 14, a second cable portion 16, and a third cable portion 18. First and second cable portions 14 and 16 are formed of the same unitary length of cable i.e., a single continuous length of, cable 15, and are separated by a first crimped connector 20 that secures a first loop 22. Cable portions 14 and 16 are equal in length, and their combined length is approximately equal to the width of the bed of truck 12 in order to prevent dog 10 from moving beyond the perimeter of the bed. A second crimped connector 24 secures a second loop 26 at one end of third cable portion 18. Loops 22 and 26 are interconnected to join cable portions 14, 16 and 18 together at a common connection point 28.

The other end of third cable portion 18 has a third crimped connector 30 that secures a third loop 32. A swivel eye latch 34 is connected through loop 32 for attaching third cable portion 18 to the collar 36 of dog 10. Cable portion 18 is less than or equal to the lengths of cable portions 14 or 16 The other ends of first and second cable portions 14 and 16 have fourth and fifth crimped connectors 38 and 40, respectively, that secure fourth and fifth loops 42 and 44, respectively. Swivel eye latches 46 and 48 are connected through loons 42 and 44, respectively, for attaching first and second cable portions 14 and 16 to hooks 50 and 52, respectively, on opposite sides of the bed of truck 12.

Cable portions 14, 16 and 18 are made of a flexible but stiff material, such as plastic-coated, twisted, multi-strand steel cable having a diameter between 1/8 and 1/4 inches, with a diameter of 3/16 inches being preferred. The resiliency of the steel cable minimizes looping and prevents crimping of the open lengths of cable, thus minimizing the likelihood of dog 10 becoming entangled in it. Furthermore, the stiffness of the cable in combination with the manner in which cable portions 14 and 16 are joined at connector 20 to form loop 22 is particularly effective at minimizing the likelihood of entangling dog 10. This combination maintains loop 22 in a direction that is generally perpendicular to the direction in which cable portions 14 and 16 span the truck bed. If dog 10 moves from one side of the span to the other, loop 22 and the portions of cable portions 14 and 16 immediately adjacent to it act in combination as a lever and cause the remainder of cable portions 14 and 16 to rotate in swivel latches 46 and 48, respectively. If, contrary to the teachings herein, cable portions 14 and 16 were made of a substantially less stiff material, such as rope, and if dog 10 were to move over or under the span formed by cable portions 14 and 16 to the other, cable portion 18 could wrap around cable portions 14 and 16 instead of rotating them in swivel eye latches 46 and 48.

Although crimping connectors 20, 30, 38 and 40 are preferred, other connectors, such as screw clamps, are also suitable. The crimping connectors are commercially available and are sold under the trademarks Swagsleeve™ and Nikopress™.

It will be evident that there are additional embodiments and applications which are not disclosed in the detailed description but which clearly fall within the scope and spirit of the present invention. The specification is, therefore, not intended to be limiting, and the scope of the invention is to be limited only by the following claims.

I claim:

1. An animal tether for restraining an animal within an area having a width, comprising:

first, second and third cable portions, each having a connected end and a free end, said connected end of said cable portions joined together, said cable portions formed of a flexible, stiff material, said first and second cable portions being halves of a continuous length of cable and having equal lengths, said third cable portion having a length no greater than the length of said first and second cable portions;

a first connector for forming a first loop at a center of said continuous length of cable to define said first and second cable portions; and three latches, each attached to said free end of one of said cable portions, said three latches comprising a first latch disposed at said free end of said first cable portion for attaching to a first side of said area, a second latch disposed at said free end of said second cable portion for attaching to a second side of said area opposite said first side so that said first cable portion and said second cable portion span the width of said area, and a third latch disposed at a free end of said third cable portion for attaching to said animal.

2. The animal tether claimed in claim 1, wherein said continuous length of cable and said third cable portion are made of a multi-strand twisted metal cable between ⅛ and ¼ inches in diameter.

3. The animal tether claimed in claim 1 further comprising:

a second connector for forming a second loop at said free end of said first cable portion, said second loop being connected to one of said latches; and a third connector for forming a third loop at said free end of said second cable portion, said third loop being connected to one of said latches.

4. The animal tether claimed in claim 1, wherein each said latch has a swivel.

5. An animal tether for limiting movement of an animal within an area having a width, the animal tether comprising:

first, second and third cable portions, each having a connected end and a free end, said connected ends of said cable portions being joined together, said cable portions being formed of multi-strand twisted metal cable;

the first and second cables having equal length and a combined length substantially equal to the width of said area, and being halves of a single continuous length of cable, said third cable portion having a length no greater than the length of said first cable;

a first connector forming a loop at a center of said continuous length of cable between said first and second cable portions, said first and second cable portions being substantially parallel at a point adjacent said first connector;

a first latch attached to said free end of said first cable portions and having a swivel, said first latch for releasable attachment to a first side of said area;

a second latch attached to said free end of said second cable portion and having a swivel, said second latch for releasable attachment to a second side of said area opposite said first side so that said combined length spans the width of said area; and a third latch attached to said free end of said third cable portion and having a swivel, said third latch for releasable attachment to the animal.

6. The animal tether claimed in claim 5, wherein said area is the bed of a pickup truck.

7. The animal tether claimed in claim 5, wherein each said cable portion is made of multi-strand twisted metal cable between ⅛ and ¼ inches in diameter.

8. The animal tether claimed in claim 5 wherein;

said first and second cable portions each are halves of a continuous length of cable; and said tether further comprises a first connector for securing a loop between said first and second cable portions.

* * * * *